(12) United States Patent
Shibata et al.

(10) Patent No.: US 9,528,676 B2
(45) Date of Patent: Dec. 27, 2016

(54) VEHICULAR LAMP

(71) Applicant: KOITO MANUFACTURING CO., LTD., Tokyo (JP)

(72) Inventors: Hiroki Shibata, Shizuoka (JP); Kazutami Oishi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 91 days.

(21) Appl. No.: 14/484,569

(22) Filed: Sep. 12, 2014

(65) Prior Publication Data
US 2015/0085511 A1    Mar. 26, 2015

(30) Foreign Application Priority Data
Sep. 26, 2013   (JP) .................................. 2013-199912

(51) Int. Cl.
| | |
|---|---|
| *F21V 17/02* | (2006.01) |
| *F21S 8/10* | (2006.01) |
| *B60Q 1/068* | (2006.01) |
| *B60Q 1/076* | (2006.01) |

(52) U.S. Cl.
CPC ......... *F21S 48/1721* (2013.01); *B60Q 1/0683* (2013.01); *B60Q 1/076* (2013.01); *F21S 48/125* (2013.01); *F21S 48/1216* (2013.01); *F21S 48/1159* (2013.01); *F21S 48/1794* (2013.01); *F21S 48/328* (2013.01)

(58) Field of Classification Search
CPC .. F21S 48/1721; F21S 48/1216; F21S 48/125; F21S 48/1795; F21S 48/1794; B60Q 1/076; B60Q 1/0683; B60Q 1/122; B60Q 1/045
USPC ......................................................... 362/512
See application file for complete search history.

(56) References Cited

U.S. PATENT DOCUMENTS

| | | | |
|---|---|---|---|
| 2008/0266890 A1* | 10/2008 | Mochizuki | B60Q 1/076 362/524 |
| 2012/0201042 A1* | 8/2012 | Shibata | B60Q 1/0683 362/538 |

FOREIGN PATENT DOCUMENTS

JP   2012043656   3/2012

* cited by examiner

*Primary Examiner* — Laura Tso
*Assistant Examiner* — Naomi M Wolford
(74) *Attorney, Agent, or Firm* — Abelman, Frayne & Schwab (57) ABSTRACT

An occupation space of a lamp including a mechanism for adjusting a reference position of an optical axis is reduced. The optical axis adjustment mechanism 17 adjusts a reference position of an optical axis of a projection lens through which at least some of the light emitted from the light source 21 passes. The optical axis adjustment mechanism 17 includes an actuator 71, an aiming screw 72 and a slider 73. The actuator 71 includes an electrically driven output shaft 71*b* which pivots the optical axis in a horizontal direction about a rotation axis B extending in a vertical direction. The slider 73 is disposed to be slidable along the rotation axis B. The aiming screw 72 slides the slider 73 according to its rotation so as to translate the optical axis in the vertical direction.

16 Claims, 9 Drawing Sheets

VEHICULAR LAMP

CROSS-REFERENCE TO RELATED APPLICATIONS

This application is based on and claims priority from Japanese Patent Application No. 2013-199912, filed on Sep. 26, 2013, with the Japan Patent Office, the disclosure of which is incorporated herein in its entirety by reference.

TECHNICAL FIELD

The disclosure relates to a lamp mounted in a vehicle.

BACKGROUND

When a lamp provided with a projection lens is attached to a housing which defines a lamp chamber, an error may occur in a required specification with respect to a reference position of an optical axis of the projection lens. In order to solve the error, there has been known a lamp provided with an aiming mechanism.

The aiming mechanism includes two screws exposed to an outside of a housing. For example, Japanese Patent Laid-Open Publication 2012-43656 discloses an aiming mechanism in which a reference position of an optical axis related to a vertical direction of a lamp is adjusted by rotating one screw, and a reference position of an optical axis related to a horizontal direction of the lamp is adjusted by rotating the other screw.

SUMMARY

When the above described mechanism configured to adjust the reference position of the optical axis is provided in the lamp, an increase of the number of components or the occupation space of the lamp is unavoidable. This suppresses miniaturization of a lighting device including the lamp.

Accordingly, an object of the present disclosure is to provide a technology of reducing an occupation space of a lamp including a mechanism configured to adjust a reference position of an optical axis.

In order to achieve the object, according to an aspect of the present disclosure, a lamp mounted in a vehicle includes a light source, a projection lens through which at least some of the light emitted from the light source passes, and an optical axis adjustment mechanism configured to adjust a reference position of an optical axis of the projection lens. The optical axis adjustment mechanism includes an actuator having an electrically driven output shaft which pivots the optical axis in a second direction intersecting with a first direction about a pivot axis extending in the first direction, a slider disposed to be slidable along the pivot axis, and an aiming screw configured to slide the slider according to rotation of the aiming screw so as to translate the optical axis in the first direction.

That is, the adjustment of the reference position of the optical axis in the second direction is performed by the actuator having the electrically driven output shaft, instead of the aiming screw. Also, the pivot axis on which the actuator acts is used in common with the sliding movement axis on which the aiming screw acts. According to the configuration, as compared to a configuration where reference position control in each direction is performed by a separate aiming screw, and a mechanism having different action axes for aiming screws is used, the number of components or the occupation space of the lamp may be reduced.

The lamp may include a support configured to support the light source, and a lens holder configured to hold the projection lens, and disposed to be displaceable independently of the support. In this case, the actuator and the slider are coupled with the lens holder.

That is, the optical axis adjustment mechanism adjusts the reference position of the optical axis by displacing the lens holder. The support is generally large in dimension and weight. According to the above described configuration, as compared to a case where such a member is displaced to adjust the reference position of the optical axis, the optical axis adjustment mechanism may be miniaturized and simplified. Further, the number of components or the occupation space of the lamp may be reduced.

The pivot axis extends to intersect with a focus of the projection lens.

According to the configuration, since the relative position between the focus and the light source is not changed according to displacement of the lens holder, the variation of the projected image according to the displacement of the lens holder may be minimized. There is no need for components or mechanisms for correcting the projected image, and thus the number of components or the occupation space of the lamp may be reduced.

The lamp may include a frame including a bearing extending in the first direction.

In this case, the lens holder includes a first portion and a second portion extending in the first direction. The first portion is coupled with the bearing to be rotatable and slidable. The second portion is coupled with the slider to be rotatable and non-slidable, and is coupled with the output shaft to be non-rotatable and slidable. The slider is supported by the frame so as to be non-rotatable and slidable with respect to the output shaft.

According to the configuration, the above described operation may be achieved by a minimum of components. Accordingly, the number of components or the occupation space of the lamp may be reduced. Each of the first portion and the second portion of the lens holder, the bearing of the frame, and the output shaft of the actuator extends in the first direction, and thus the lens holder may be easily attached to the frame or the actuator. This improves the assembly operability.

The lamp may include a reflector configured to reflect at least some of the light emitted from the light source toward the projection lens. In this case, a non-through hole configured to receive a part of the first portion is formed at a position facing the bearing in the reflector.

In order to improve the light distribution controllability by the reflector, it is preferable to secure a large area of the reflecting surface.

However, when the reflecting surface comes close to the lens holder, the reflecting surface may interfere with the first portion of the lens holder which slides according to the translation of the optical axis in the first direction. According to the above described configuration, since a part of the first portion may be received by the non-through hole which does not reach the reflecting surface, it is possible to improve the light distribution controllability, and secure a large displacement amount of the lens holder in the first direction. Since the use efficiency of a space is increased, the occupation space of the lamp may be reduced.

The aiming screw may extend through the support.

According to the above described configuration, the occupation space of the lamp may be further reduced. When the lamp is mounted in the lighting device, a part of the support which the aiming screw penetrates is disposed outside the housing which defines the lamp chamber. Thus, the operability of the aiming screw and the dissipationability of heat generated from the light source may be improved.

The first direction may correspond to a vertical direction of the vehicle.

In the above described configuration, it is possible to reduce the vertical dimension of the lamp which is relatively highly restricted in layout when the lamp is mounted in the lighting device. Further, the actuator capable of securing a large pivoting amount may be used in the swivel control in which a larger pivoting amount of the optical axis is obtained as compared to in a horizontal aiming operation.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described in detail with reference to accompanying drawings. In the respective drawings used in the following description, a scale is suitably changed in order to have a recognizable size of each element. Also, "right side" and "left side" used in the following description indicate left and right directions viewed from the driver's seat.

Figure 1:
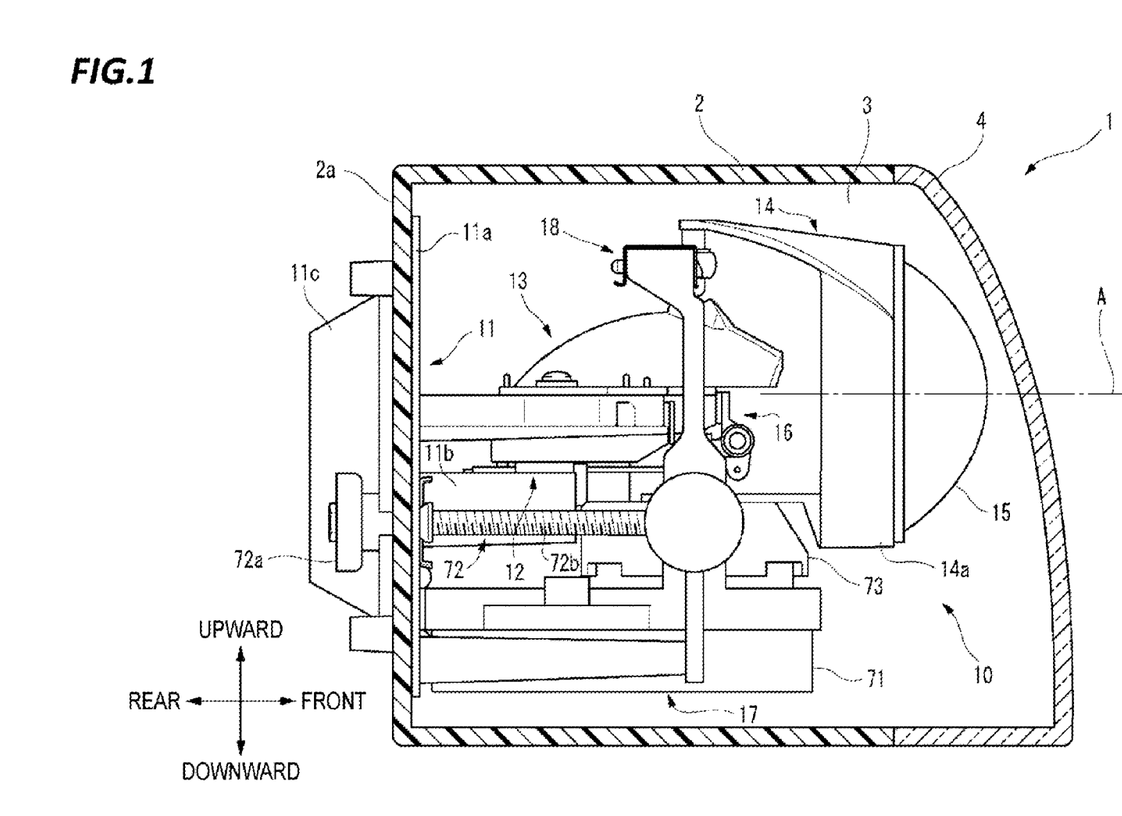
FIG. 1 is a right-side cross sectional view illustrating a part of a lighting device including a lamp unit according to an exemplary embodiment of the present disclosure.

FIG. 1 is a cross-sectional view illustrating a part of a headlight device 1 when seen from the right side. The headlight device 1 is a device mounted in a front portion of a vehicle to illuminate a forward side. The headlight device 1 includes a housing 2, and a translucent cover 4 which is mounted on the housing 2 to define a lamp chamber 3. Within the lamp chamber 3, a lamp unit 10 (an exemplary lamp) according to an exemplary embodiment of the present disclosure is disposed.

The lamp unit 10 includes a heat sink 11, a light source unit 12, a reflector 13, a lens holder 14, a projection lens 15, a light distribution control unit 16, an optical axis adjustment mechanism 17, and a support frame 18. The optical axis adjustment mechanism 17 includes an actuator 71, an aiming screw 72 and a slider 73.

Figure 2:
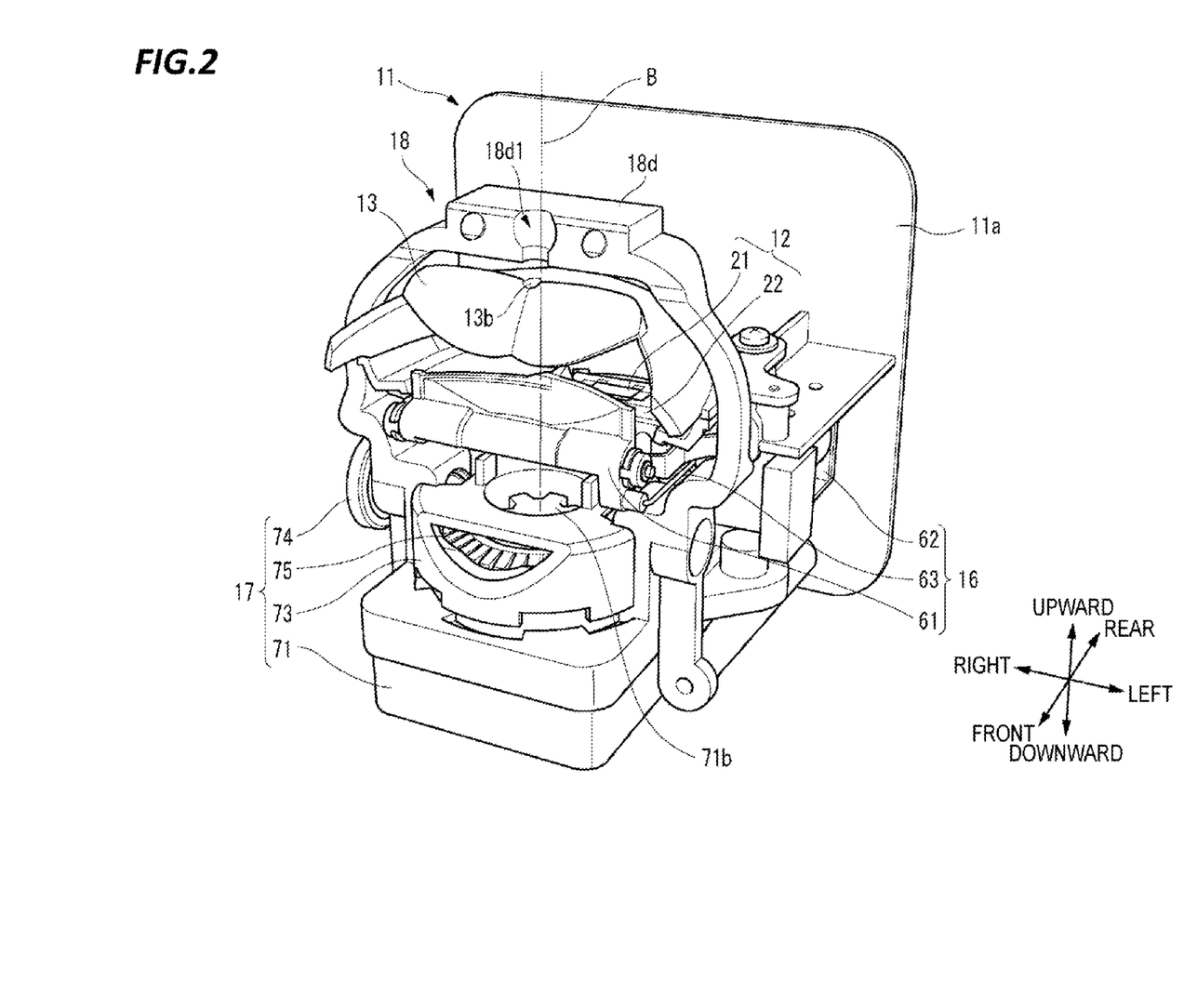
FIG. 2 is a perspective view illustrating a part of the lamp unit of FIG. 1.
Figure 3:
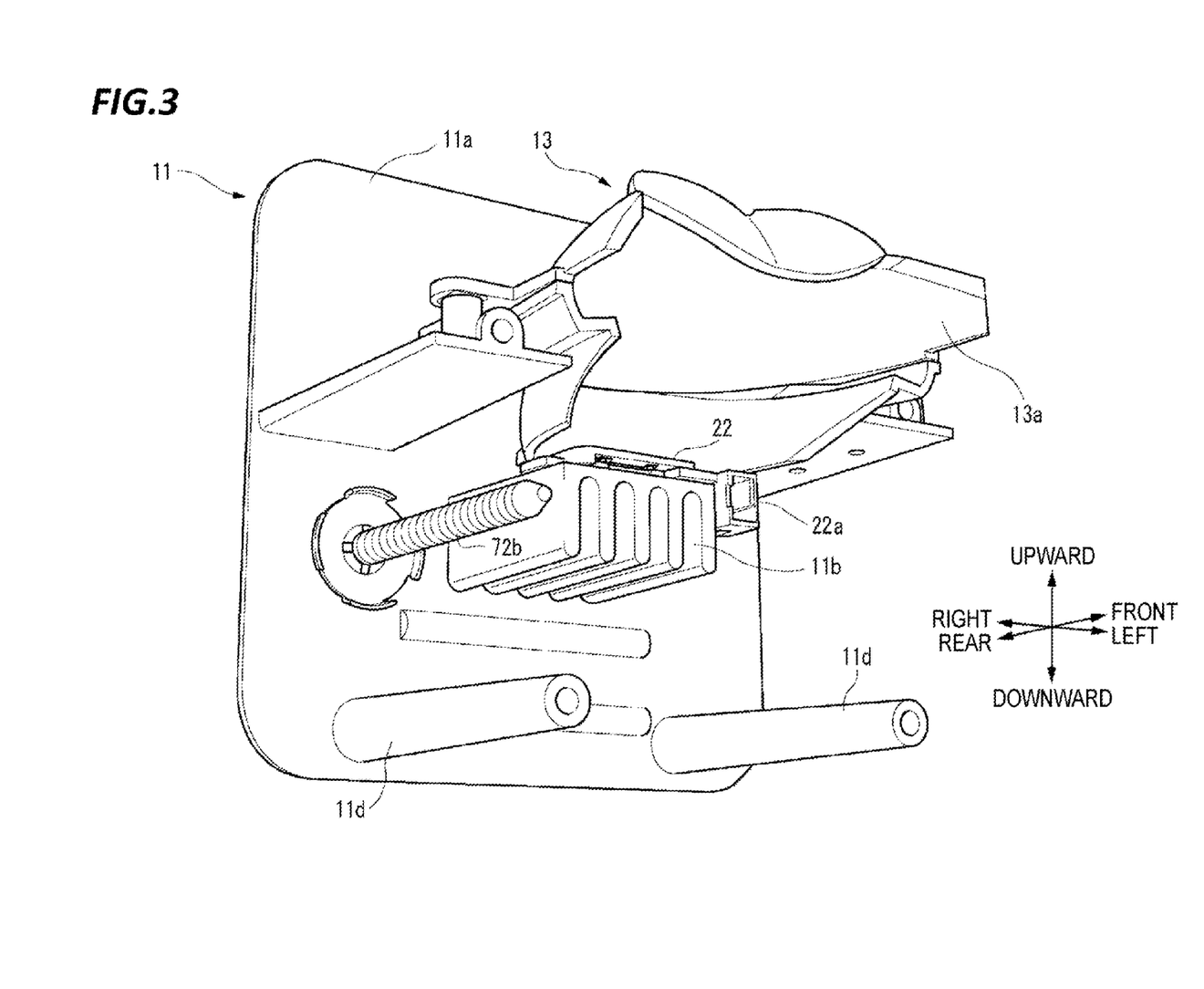
FIG. 3 is a perspective view illustrating a part of the lamp unit of FIG. 1.

FIG. 2 is a perspective view illustrating the lamp unit 10 in a state where the lens holder 14 and the projection lens 15 are removed. FIG. 3 is a perspective view illustrating the lamp unit 10 in a state where the support frame 18, the light distribution control unit 16, the actuator 71, and the slider 73 are further removed from a state illustrated in FIG. 2.

As illustrated in FIG. 3, the heat sink 11 includes a back plate 11a which extends in vertical and horizontal directions. A support unit 11b extends in the forward direction, at the front side of the back plate 11a. As illustrated in FIG. 1, a heat dissipation plate 11c is formed at the back side of the back plate 11a. The heat dissipation plate 11c extends in the vertical direction.

The lamp unit 10 is assembled with respect to the housing 2 at the inside of the lamp chamber 3. The back plate 11a of the heat sink 11 faces a back wall 2a of the housing 2. An opening (not illustrated) is formed in the back wall 2a. A portion of the heat sink 11 in which the heat dissipation plate 11c is formed is inserted through the opening and exposed to the outside of the back wall 2a.

As illustrated in FIG. 2, the light source unit 12 includes a light source 21 and an attachment 22. The light source 21 is, for example, a white light emitting diode (LED). The attachment 22 fixes the light source 21 on the support unit 11b. As illustrated in FIG. 3, the attachment 22 includes a connector 22a. A counterpart connector (not illustrated) is connected to the connector 22a to supply a power to the light source 21. The light source 21 is turned on by the power supplied through the connector 22a.

As illustrated in FIGS. 2 and 3, the reflector 13 has a dome shape. An inner surface 13a of the reflector 13 is formed of a reflecting surface. The reflector 13 is disposed so that a portion of the reflecting surface faces the light source 21.

As illustrated in FIG. 1, the lens holder 14 is disposed in front of the reflector 13. The lens holder 14 includes an annular lens holding frame 14a. The projection lens 15 is fixed at the front side of the lens holding frame 14a.

Light emitted from the light source 21 is reflected forward by the inner surface 13a of the reflector 13, and at least some of the emitted light passes through the projection lens 15. The light which has passed through the projection lens 15 illuminates the forward side through the translucent cover 4.

As illustrated in FIG. 2, the light distribution control unit 16 includes a movable shade 61, a solenoid 62, and a link 63.

The movable shade 61 is disposed slightly ahead of a rear focus of the projection lens 15. Accordingly, some of the light which has been emitted from the light source 21, and reflected by the inner surface 13a of the reflector 13 is shielded by the movable shade 61. The shape of the upper edge of the movable shade 61 is inversely projected toward the front side to form a low beam light distribution pattern at the forward side of the vehicle. The low beam light distribution pattern refers to a light distribution pattern which has a cutoff line corresponding to the shape of the upper edge of the movable shade 61, and has a zone below the cutoff line as a lighting area.

A plunger (not illustrated) provided in the solenoid 62 is connected to the movable shade 61 through the link 63. A power is supplied to a coil provided in the solenoid 62, and the plunger is operated so that the movable shade 61 is tilted backward through the link 63. Accordingly, the upper edge of the movable shade 61 is retracted below an optical axis A (see FIG. 1) of the projection lens 15 to cancel the light-shielding state of the light emitted from the light source 21. The light which has been emitted from the light source 21, and reflected by the reflector 13 passes through the projection lens 15 and forms a high beam light distribution pattern which illuminates a forward wide range of the vehicle to a long distance.

The optical axis adjustment mechanism 17 is a mechanism configured to adjust a reference position of the optical axis A of the projection lens 15. Besides the actuator 71, the aiming screw 72, and the slider 73 as described above, as illustrated in FIG. 2, the optical axis adjustment mechanism 17 includes a first gear 74 and a second gear 75.

Figure 4:
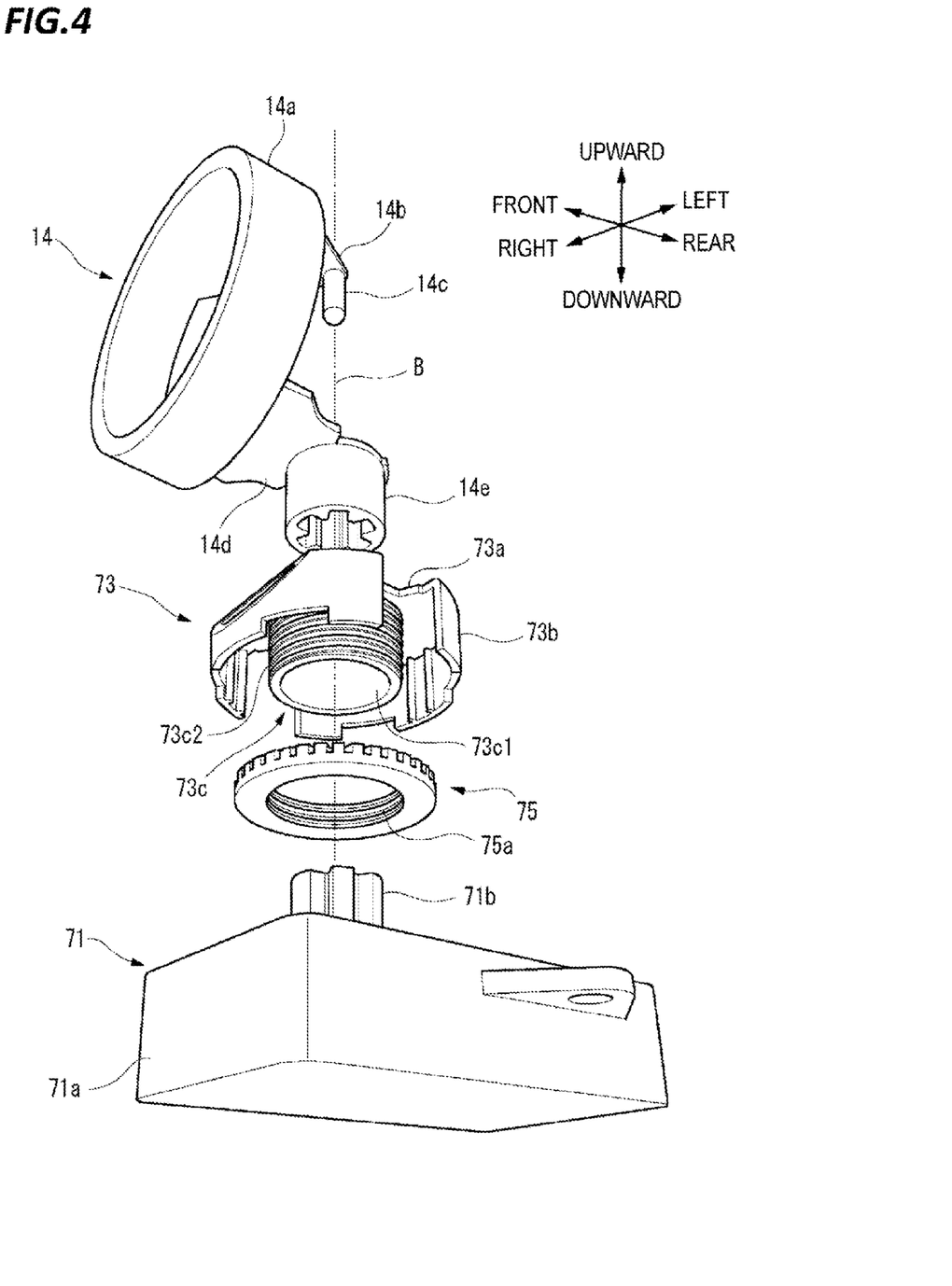
FIG. 4 is an exploded perspective view illustrating a part of the lamp unit of FIG. 1.
Figure 5:
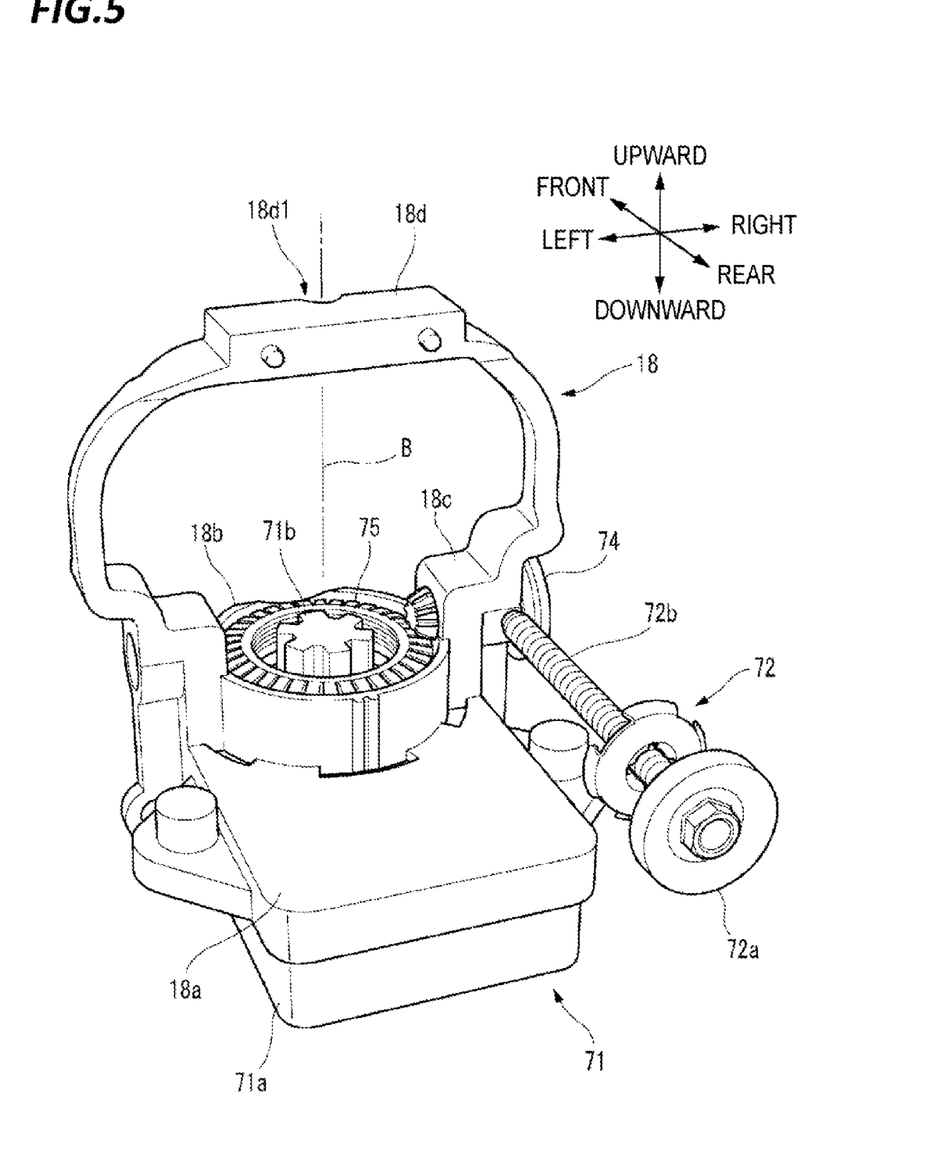
FIG. 5 is a perspective view illustrating a part of the lamp unit of FIG. 1.
Figure 6:
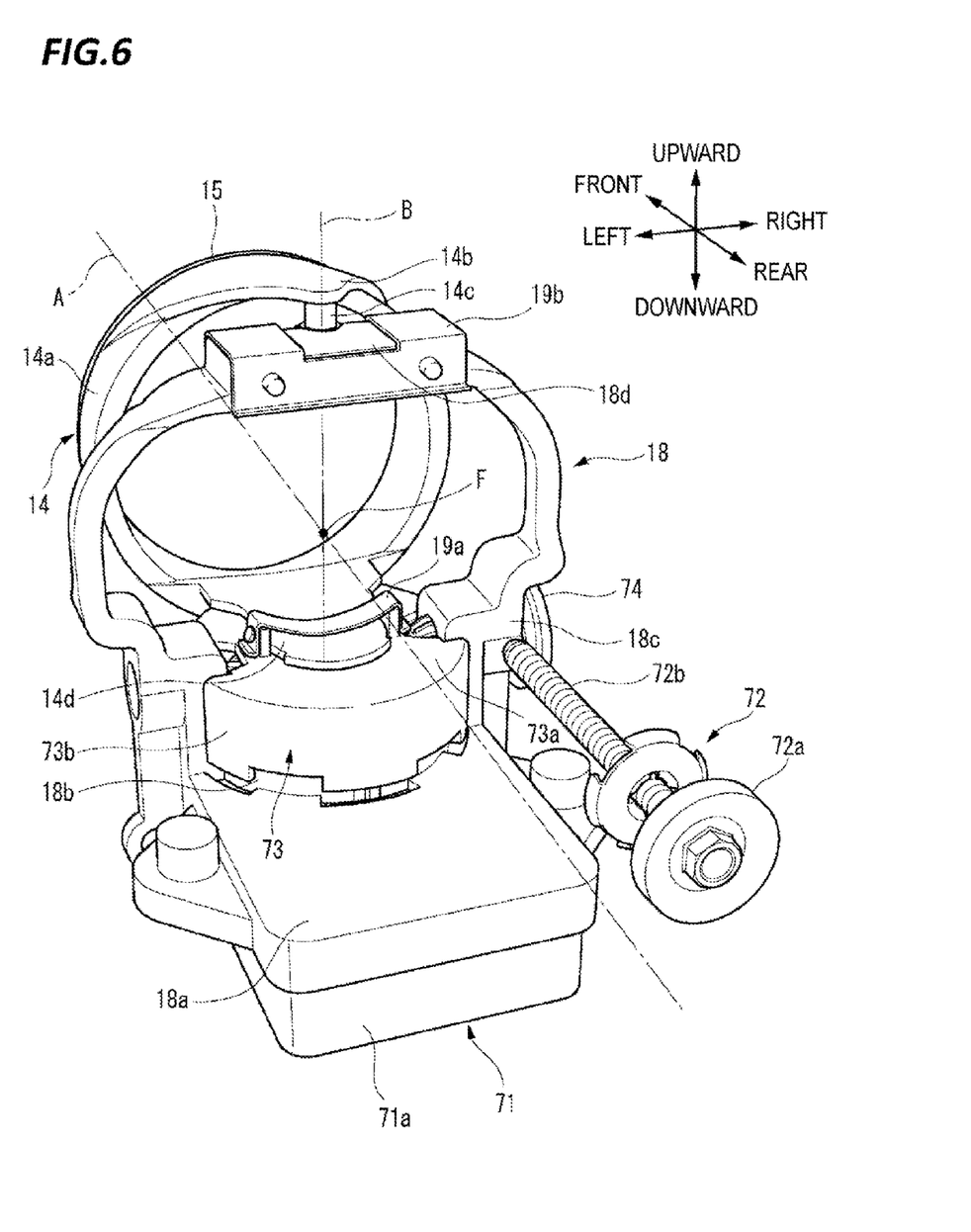
FIG. 6 is a perspective view illustrating a part of the lamp unit of FIG. 1.

FIG. 4 is an exploded perspective view illustrating the relationship between the lens holder 14, the actuator 71, the slider 73, and the second gear 75. FIG. 5 is a perspective view illustrating the state where the actuator 71, the aiming screw 72, the first gear 74, and the second gear 75 are assembled with the support frame 18. FIG. 6 is a perspective view illustrating the state where in addition to the state illustrated in FIG. 5, the slider 73, the lens holder 14, and the projection lens 15 are assembled with the support frame 18.

As illustrated in FIGS. 2 and 4, the actuator 71 includes a case 71a and an output shaft 71b. The output shaft 71b is configured to be rotatable around a rotation axis B extending in the vertical direction. A driving circuit provided within the case 71a receives a control signal from a control unit (not illustrated) provided at the outside of the lamp unit 10. The output shaft 71b is an electrically driven shaft which rotates according to the control signal.

As illustrated in FIGS. 1 and 3, the aiming screw 72 extends in the longitudinal direction through the back plate 11a of the heat sink 11. The aiming screw 72 includes a head portion 72a and a shaft portion 72b. The head portion 72a is disposed at the outside of the housing 2 (behind the back wall 2a). Screw grooves are formed on the shaft portion 72b.

As illustrated in FIG. 5, the support frame 18 includes a first support portion 18a, a second support portion 18b, a third support portion 18c, and a fourth support portion 18d.

The first support portion 18a supports the actuator 71. The first support portion 18a is a rectangular frame which defines a space which is opened downward. The case 71a of the actuator 71 is attached and fixed to the space from below.

The second support portion 18b is a cylindrical frame provided at the front side of the first support portion 18a. The second support portion 18b defines a space which communicates the top side of the first support portion 18a with the bottom side. When the case 71a of the actuator 71 is mounted in the first support portion 18a, the output shaft 71b is disposed within the second support portion 18b. The output shaft 71b is exposed to the top side within the second support portion 18b.

The second gear 75 is disposed within the second support portion 18b. The annular second gear 75 is disposed to surround the output shaft 71b of the actuator 71. The second gear 75 is supported by the second support portion 18b to be rotatable around the rotation axis B. The output shaft 71b and the second gear 75 are rotatable independently of one another.

The third support portion 18c supports the front end portion of the shaft portion 72b of the aiming screw 72, and the first gear 74. A through hole extending in the horizontal direction and a through hole extending in the longitudinal direction are formed in the third support portion 18c. First, the first gear 74 is mounted in the horizontally extending through hole to mesh with the second gear 75 supported within the second support portion 18b. Subsequently, the shaft portion 72b is inserted into the longitudinally extending through hole so that the screw grooves formed on the tip portion of the shaft portion 72b mesh with the first gear 74. That is, a rotation of the aiming screw 72 is converted into a rotation around the rotation axis B of the second gear 75 through the first gear 74.

The fourth support portion 18d is disposed above the second support portion 18b. As illustrated in FIG. 2, a bearing groove 18d1 extending in the vertical direction is formed in the fourth support portion 18d. The fourth support portion 18d is disposed so that the rotation axis B passes through the inside of the bearing groove 18d1.

As illustrated in FIG. 6, the slider 73 is mounted to the support frame 18 to cover the second support portion 18b. The slider 73 includes an annular top wall 73a, and a side wall 73b extending downward from the periphery of the top wall 73a. As illustrated in FIG. 4, the slider 73 includes a cylindrical portion 73c extending downward from the bottom surface of the top wall 73a. The cylindrical portion 73c defines a through hole 73c1 therein. The through hole 73c1 communicates the top side of the slider 73 with the bottom side. Screw grooves 73c2 are formed on the outer peripheral surface of the cylindrical portion 73c. Meanwhile, screw grooves 75a are also formed on the inner peripheral surface of the annular second gear 75. The screw grooves 73c2 of the slider 73 and the screw grooves 75a of the second gear 75 are configured to mesh with each other.

The lens holder 14 includes an upper arm 14b, an upper shaft 14c, a lower arm 14d, and a lower shaft 14e. The upper arm 14b extends backward from the top portion of the lens holding frame 14a. The upper shaft 14c extends downward from the rear end of the upper arm 14b. The lower arm 14d extends backward from the bottom portion of the lens holding frame 14a. The lower shaft 14e extends downward from the rear end of the lower arm 14d. The center of the upper shaft 14c and the center of the lower shaft 14e are consistent with each other when viewed form the top side.

As illustrated in FIG. 6, the lens holder 14 is mounted with respect to the support frame 18 and the slider 73. In particular, the lens holder 14 is mounted from the top side so that the upper shaft 14c is received in the bearing groove 18d1 formed in the fourth support portion 18d of the support frame 18, and the lower shaft 14e is inserted into the through hole 73c1 of the slider 73. Here, as illustrated in FIG. 4, the output shaft 71b of the actuator 71 is fitted into the fitting hole formed in the lower shaft 14e. Accordingly, the center of each of the upper shaft 14c and the lower shaft 14e is disposed to be consistent with the rotation axis B.

Projecting and recessed portions arranged in the circumferential direction are formed on each of the inner peripheral surface of the fitting hole formed in the lower shaft 14e, and the outer peripheral surface of the output shaft 71b. Accordingly, the lower shaft 14e and the output shaft 71b are relatively non-rotatable and relatively slidable.

As illustrated in FIG. 6, the lower arm 14d of the lens holder 14 is fixed to the slider 73 by a holding member 19a.

Accordingly, the lens holder 14 and the slider 73 are relatively rotatable and relatively non-slidable. A part of the slider 73 is engaged with the support frame 18 so that the slider 73 is slidable along the rotation axis B in the vertical direction and non-rotatable around the rotation axis B.

Figure 7:
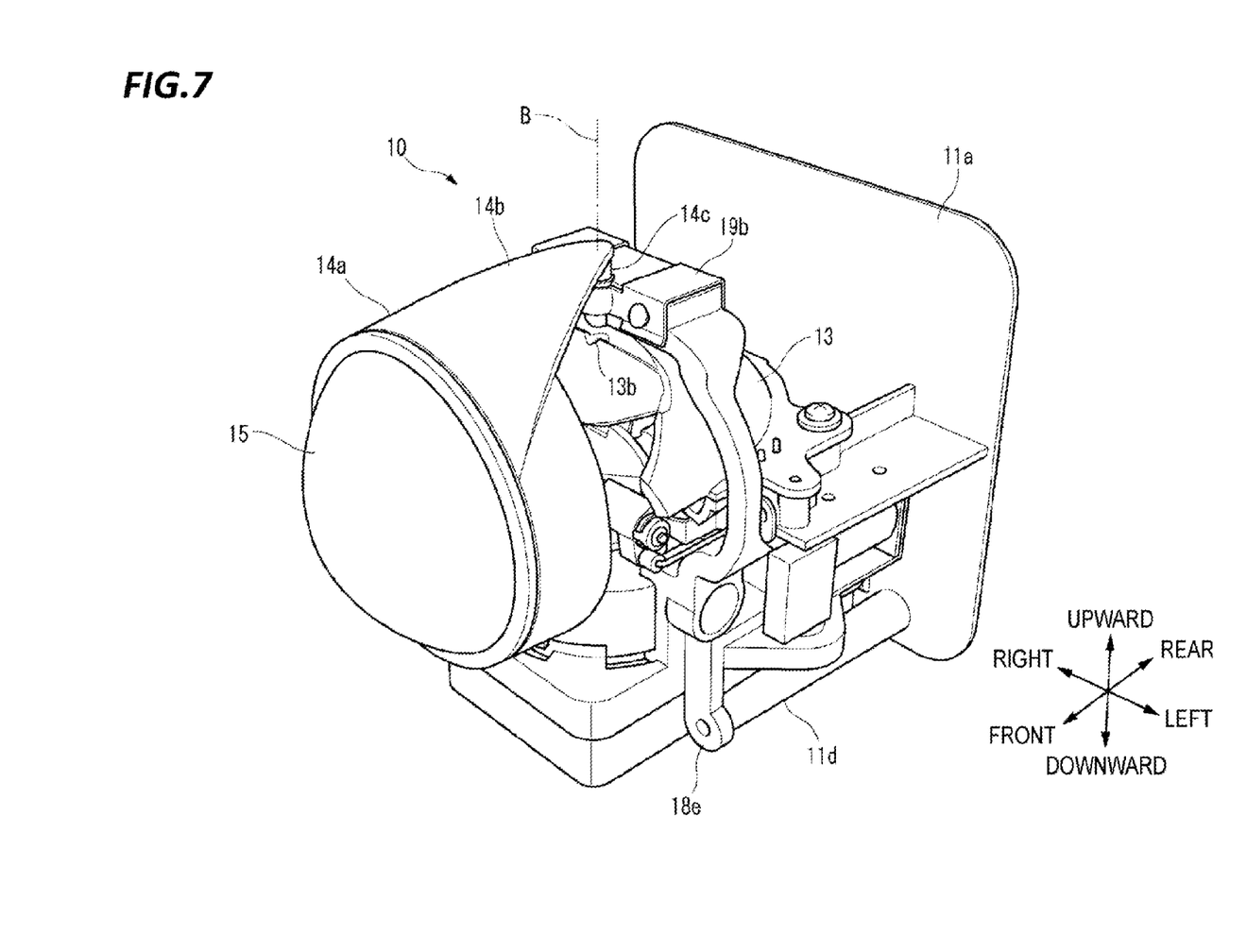
FIG. 7 is a perspective view illustrating the lamp unit of FIG. 1.

FIG. 7 is a perspective view illustrating the whole of the lamp unit 10. The upper shaft 14c of the lens holder 14 is held within the bearing groove 18d1 formed in the fourth support portion 18d of the support frame 18, by a holding member 19b. Here, the upper shaft 14c is slidable along the rotation axis B in the vertical direction and rotatable around the rotation axis B.

The support frame 18 includes a couple of fixing portions 18e below the fourth support portion 18d (in FIG. 7, only a fixing portion 18e at left side is illustrated). Meanwhile, as illustrated in FIG. 3, the heat sink 11 includes a couple of fixing columns 11d. Each of the fixing columns 11d extends ahead of the back plate 11a. As illustrated in FIG. 7, the fixing portion 18e of the support frame 18 is disposed at the front end of the fixing column 11d. The fixing portion 18e is fastened with the fixing column 11d by a suitable fastening member to fix the support frame 18 to the heat sink 11.

In this state, as illustrated in FIG. 6, the rotation axis B is disposed to intersect with the rear focus F of the projection lens 15.

In the lamp unit 10 configured as described above, descriptions will be made on a so-called vertical aiming operation for vertically adjusting the reference position of the optical axis A of the projection lens 15. The vertical aiming operation is performed by using the aiming screw 72.

When the shaft portion 72b is rotated clockwise by operating the head portion 72a disposed outside the housing 2, the first gear 74 meshing with the screw grooves formed at the tip of the shaft portion 72b is rotated forwards (see FIG. 5). According to this rotation, the second gear 75 meshing with the first gear 74 is rotated clockwise around the rotation axis B (see FIG. 5). By this rotation, the cylindrical portion 73c of the slider 73 which has the screw grooves 73c2 screwed with the screw grooves 75a of the second gear 75 is displaced upwards (see FIG. 4). Accordingly, the slider 73 is slid upwards along the rotation axis B (see FIG. 6).

Figure 8A:
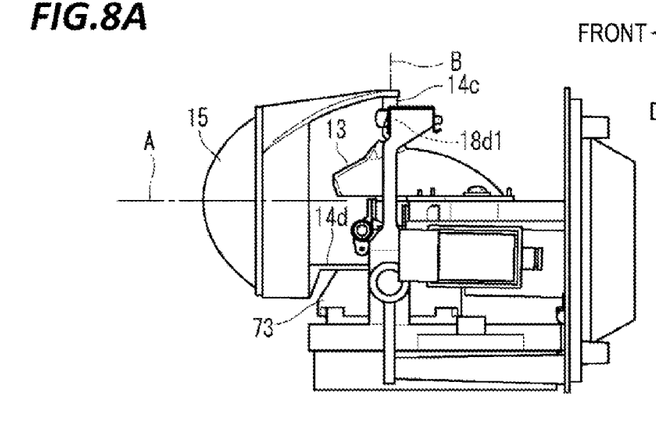
FIGS. 8A to 8C are left side views for explaining an operation of vertically displacing a reference position of an optical axis of a projection lens provided in the lamp unit of FIG. 1.
Figure 8B:
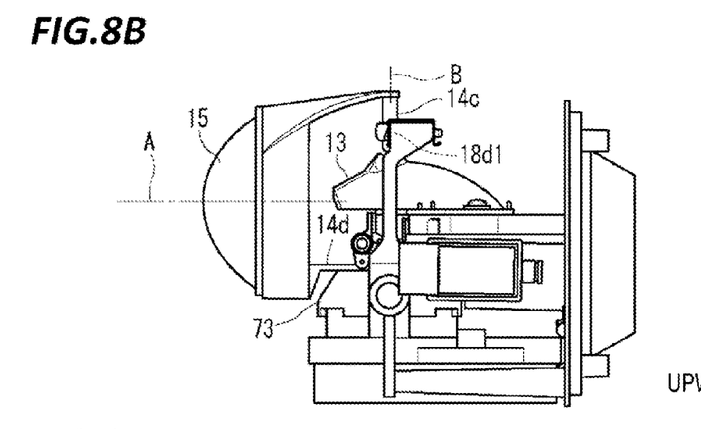

FIG. 8A is a side view of the lamp unit 10 in a state where the optical axis A is disposed at an initial location when seen from the left side. When the slider 73 is slid upwards by the above described operation, the lens holder 14 coupled to the slider 73 through the lower arm 14d is also slid upwards. Accordingly, as illustrated in FIG. 8B, the optical axis A of the projection lens 15 is translated upwards. Here, the upper shaft 14c of the lens holder 14 is slid upwards within the bearing groove 18d1 formed in the fourth support portion 18d of the support frame 18. Although not illustrated, the lower shaft 14e of the lens holder 14 is slid upwards while being fitted to the output shaft 71b of the actuator 71.

In contrast, when the shaft portion 72b of the aiming screw 72 is rotated counterclockwise, the first gear 74 meshing with the screw grooves formed at the tip of the shaft portion 72b is rotated backwards (see FIG. 5). According to this rotation, the second gear 75 meshing with the first gear 74 is rotated counterclockwise around the rotation axis B (see FIG. 5). By this rotation, the cylindrical portion 73c of the slider 73 which has the screw grooves 73c2 screwed with the screw grooves 75a of the second gear 75 is displaced downwards (see FIG. 4). Accordingly, the slider 73 is slid downwards along the rotation axis B (see FIG. 6).

Figure 8C:
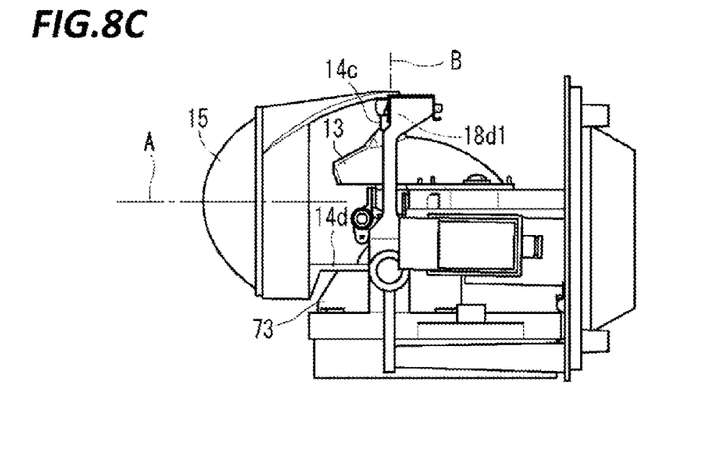

When the slider 73 is slid downwards by the above described operation, the lens holder 14 coupled to the slider 73 through the lower arm 14d is slid downwards. Accordingly, as illustrated in FIG. 8C, the optical axis A of the projection lens 15 is translated downwards. Here, the upper shaft 14c of the lens holder 14 is slid downwards within the bearing groove 18d1 formed in the fourth support portion 18d of the support frame 18. Although not illustrated, the lower shaft 14e of the lens holder 14 is slid downwards while being fitted to the output shaft 71b of the actuator 71.

As illustrated in FIGS. 2 and 7, in the reflector 13, a non-through hole 13b is formed at a position facing the bearing groove 18d1. The non-through hole 13b is configured to receive the upper shaft 14c of the lens holder 14 which is slid downwards according to downward translation of the optical axis A.

As described above, the aiming screw 72 may slide the slider 73 according to its rotation, and may translate the optical axis A of the projection lens 15 in the vertical direction.

Figure 9A:
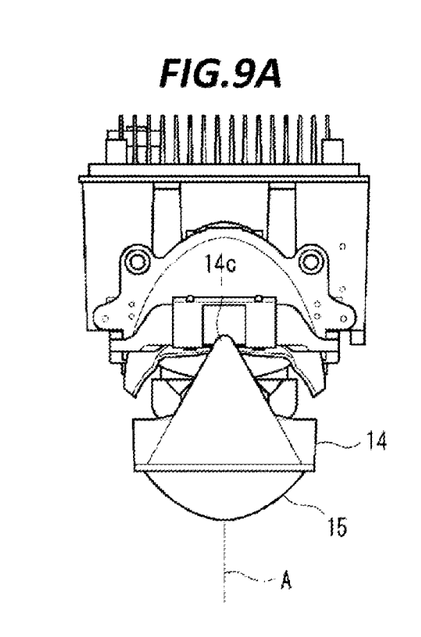
FIGS. 9A to 9C are plan views for explaining an operation of horizontally displacing a reference position of an optical axis of a projection lens provided in the lamp unit of FIG. 1.

Hereinafter, descriptions will be made on a so-called horizontal aiming operation for horizontally adjusting the reference position of the optical axis A of the projection lens 15. The horizontal aiming operation is performed by using the actuator 71. FIG. 9A is a view of the lamp unit 10 in a state where the optical axis A is disposed at an initial location when seen from the front side.

Figure 9B:
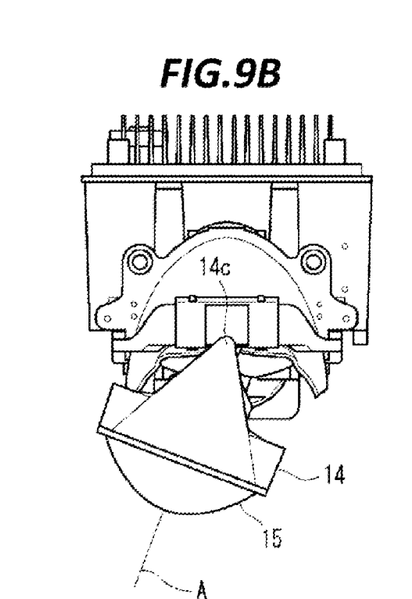

In order to displace the reference position of the optical axis A rightwards, the output shaft 71b of the actuator 71 is slightly rotated clockwise by inputting a control signal from a control unit (not illustrated) provided outside the lamp unit 10. Accordingly, as illustrated in FIG. 9B, the lens holder 14 is pivoted rightwards about the rotation axis B through the lower shaft 14e of the lens holder 14 which is relatively non-rotatably coupled. That is, the rotation axis B becomes a pivot axis of the lens holder 14. Here, the upper shaft 14c of the lens holder 14 is rotated clockwise around the rotation axis B within the bearing groove 18d1 formed in the fourth support portion 18d of the support frame 18.

Figure 9C:
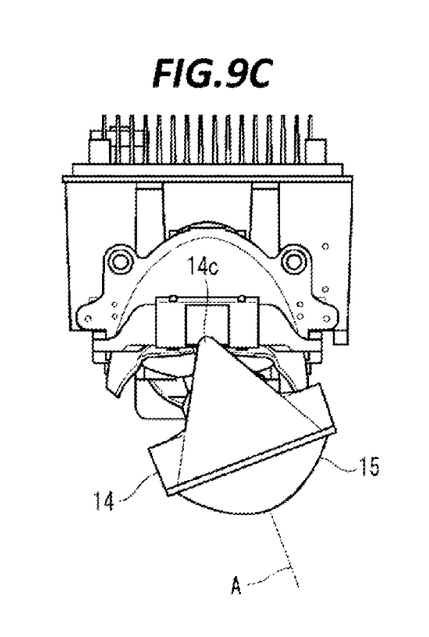

In order to displace the reference position of the optical axis A leftwards, the output shaft 71b of the actuator 71 is slightly rotated counterclockwise by inputting a control signal from a control unit (not illustrated) provided outside the lamp unit 10. Accordingly, as illustrated in FIG. 9C, the lens holder 14 is pivoted leftwards about the rotation axis B (a pivot axis) through the lower shaft 14e of the lens holder 14 which is relatively non-rotatably coupled. Here, the upper shaft 14c of the lens holder 14 is rotated counterclockwise around the rotation axis B within the bearing groove 18d1 formed in the fourth support portion 18d of the support frame 18.

The actuator 71 may be also used as a swivel actuator which changes the direction of the optical axis A of the projection lens 15 along the horizontal direction so that a traveling direction of a vehicle may be more effectively illuminated during, for example, curved road traveling. In order to change the direction of the optical axis A rightwards, the actuator 71 may be controlled so that the output shaft 71b is rotated clockwise at a larger angle. In order to change the direction of the optical axis A leftwards, the actuator 71 may be controlled so that the output shaft 71b is rotated counterclockwise at a larger angle.

As described above, the lamp unit 10 according to the present exemplary embodiment includes the optical axis adjustment mechanism 17 configured to adjust the reference position of the optical axis A of the projection lens 15. The optical axis adjustment mechanism 17 includes the actuator 71, the aiming screw 72, and the slider 73. The actuator 71 includes the electrically driven output shaft 71b which pivots the optical axis A in the horizontal direction (an exemplary second direction) about the pivot axis (the rotation axis B) extending in the vertical direction (an exemplary first direction). The slider 73 is disposed to be slidable along the pivot axis. The aiming screw 72 slides the slider 73 according to its rotation, thereby translating the optical axis A in the vertical direction.

That is, the adjustment of the reference position of the optical axis A in the horizontal direction is performed by the actuator 71 having the electrically driven output shaft, instead of the aiming screw. Also, the rotation axis B is used, in common, as the pivot axis on which the actuator 71 acts, and the sliding movement axis on which the aiming screw 72 acts. According to the configuration, as compared to a configuration where reference position adjustment in each direction is performed by a separate aiming screw, and a mechanism having different action axes for aiming screws is used, the number of components or the occupation space of the lamp unit 10 may be reduced.

The lamp unit 10 according to the present exemplary embodiment includes the heat sink 11 and the lens holder 14. The heat sink 11 (an exemplar support) supports the light source 21. The lens holder 14 holds the projection lens 15 and is disposed to be displaceable independently of the heat sink 11. The actuator 71 and the slider 73 are coupled with the lens holder 14.

That is, the optical axis adjustment mechanism 17 adjusts the reference position of the optical axis A by displacing the lens holder 14. As long as a desired control function is achieved, a target to be displaced by the optical axis adjustment mechanism 17 is arbitrary. However, the heat sink 11 is generally large in dimension and weight. According to the above described configuration, as compared to a case where such a member is displaced to adjust the reference position of the optical axis, the optical axis adjustment mechanism 17 may be miniaturized and simplified. Further, the number of components or the occupation space of the lamp unit 10 may be reduced.

As described above with reference to FIG. 6, the pivot axis (the rotation axis B) of the lens holder 14 extends to intersect with the rear focus F of the projection lens 15.

According to the configuration, since the relative position between the focus F and the light source 21 is not changed according to displacement of the lens holder 14, the variation of the projected image according to the displacement of the lens holder 14 may be minimized. There is no need for components or mechanisms for correcting the projected image, and thus the number of components or the occupation space of the lamp unit 10 may be reduced.

The lamp unit 10 according to the present exemplary embodiment includes the support frame 18. The support frame 18 includes the bearing groove 18d1 extending in the vertical direction. The lens holder 14 includes the upper shaft 14c (an exemplary first portion) and the lower shaft 14e (an exemplary second portion) which extend in the vertical direction. The upper shaft 14c is coupled with the bearing groove 18d1 to be rotatable and slidable. The lower shaft 14e is coupled with the slider 73 to be rotatable and non-slidable. The lower shaft 14e is coupled with the output shaft 71b of the actuator 71 to be non-rotatable and slidable. The slider 73 is supported by the support frame 18 so as to be non-rotatable and slidable with respect to the output shaft 71b.

According to the configuration, the above described operation may be achieved by a minimum of components. Accordingly, the number of components or the occupation space of the lamp unit 10 may be reduced. Each of the upper shaft 14c and the lower shaft 14e of the lens holder, the bearing groove 18d1 of the support frame 18, and the output shaft 71b of the actuator 71 extends in a direction along the rotation axis B, and thus the lens holder 14 may be easily attached to the support frame 18 or the actuator 71. This improves the assembly operability.

The lamp unit 10 according to the present exemplary embodiment includes the reflector 13. The reflector 13 reflects at least some of the light emitted from the light source 21 toward the projection lens 15. In the reflector 13, the non-through hole 13b configured to receive a part of the upper shaft 14c of the lens holder 14 is formed at a position facing the bearing groove 18d1.

In order to improve the light distribution controllability by the reflector 13, it is preferable to secure a large area of the reflecting surface 13a. However, when the reflecting surface 13a comes close to the lens holder 14, the reflecting surface 13a may interfere with the upper shaft 14c which slides according to the translation of the optical axis A in the vertical direction. According to the above described configuration, since a part of the upper shaft 14c may be received by the non-through hole 13b which does not reach the reflecting surface 13a, it is possible to improve the light distribution controllability, and secure a large displacement amount of the lens holder 14 in the vertical direction. Since the use efficiency of a space is increased, the occupation space of the lamp unit 10 may be reduced.

In the lamp unit 10 according to the present exemplary embodiment, the aiming screw 72 extends through the heat sink 11.

According to the above described configuration, the occupation space of the lamp unit 10 may be further reduced. When the lamp unit 10 is mounted in the headlight device 1, a part of the heat sink 11 which the aiming screw 72 penetrates is disposed outside the housing 2 which defines the lamp chamber 3. Thus, the operability of the aiming screw 72 and the dissipation of heat generated from the light source 21 may be improved.

In the lamp unit 10 according to the present disclosure, the movement direction in translation of the optical axis A is set as a vertical direction of a vehicle, and the movement direction of the optical axis A according to the operation of the actuator 71 is set as a horizontal direction of the vehicle.

As long as a desired optical axis control function is achieved, the direction of the translation of the optical axis A and the direction of the pivoting of the optical axis A may be freely selected. However, in the above described configuration, it is possible to reduce the vertical dimension of the lamp unit 10 which is relatively highly restricted in layout when the lamp unit 10 is mounted in the headlight device 1. Further, the actuator 71 capable of securing a large pivoting amount may be used in the swivel control in which a larger pivoting amount of the optical axis A is obtained as compared to in a horizontal aiming operation.

The above exemplary embodiment is made only for the purpose of easy understanding of the present disclosure, but is not intended to limit the present disclosure. The present disclosure may be changed or modified without departing from the spirit of the present disclosure, and apparently includes equivalents thereof.

If there is no need to form a plurality of light distribution patterns by using the single light source 21, it is not required to provide the light distribution control unit 16 which necessarily includes the movable shade 61.

That is, the lighting device in which the lamp unit 10 according to the present disclosure is mounted is not limited to the headlight device 1. The present disclosure may be employed in a suitable lamp to be mounted in a lighting device for a vehicle as long as the lamp is used for adjusting the reference position of the optical axis A of the projection lens 15.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A lamp mounted in a vehicle, comprising:
a light source,
a projection lens through which at least some of light emitted from the light source passes, and
an optical axis adjustment mechanism configured to adjust a reference position of an optical axis of the projection lens,
wherein the optical axis adjustment mechanism includes an actuator having an electrically driven output shaft which pivots the optical axis in a second direction intersecting with a first direction about a pivot axis extending in the first direction,
a slider disposed to be slidable along the pivot axis, and
an aiming screw configured to slide the slider according to rotation of the aiming screw so as to translate the optical axis in the first direction, and
wherein the pivot axis on which the actuator acts is used in common as a sliding movement axis on which the aiming screw acts.

2. The lamp of claim 1, further comprising:
a support configured to support the light source, and
a lens holder configured to hold the projection lens, and disposed to be displaceable independently of the support,
wherein the actuator and the slider are coupled with the lens holder.

3. The lamp of claim 2, wherein the pivot axis extends to intersect with a focus of the projection lens.

4. The lamp of claim 2, further comprising:
a frame including a bearing extending in the first direction,
wherein the lens holder includes a first portion and a second portion extending in the first direction, and
the first portion is coupled with the bearing to be rotatable and slidable,
the second portion is coupled with the slider to be rotatable and non-slidable, and is coupled with the output shaft to be non-rotatable and slidable, and
the slider is supported by the frame so as to be non-rotatable and slidable with respect to the output shaft.

5. The lamp of claim 3, further comprising:
a frame including a bearing extending in the first direction,
wherein the lens holder includes a first portion and a second portion extending in the first direction, and
the first portion is coupled with the bearing to be rotatable and slidable,
the second portion is coupled with the slider to be rotatable and non-slidable, and is coupled with the output shaft to be non-rotatable and slidable, and
the slider is supported by the frame so as to be non-rotatable and slidable with respect to the output shaft.

6. The lamp of claim 4, further comprising:
a reflector configured to reflect at least some of the light emitted from the light source toward the projection lens,
wherein a non-through hole configured to receive a part of the first portion is formed at a position facing the bearing in the reflector.

7. The lamp of claim 5, further comprising:
a reflector configured to reflect at least some of the light emitted from the light source toward the projection lens,
wherein a non-through hole configured to receive a part of the first portion is formed at a position facing the bearing in the reflector.

8. The lamp of claim 1, further comprising
a support configured to support the light source, and
wherein the aiming screw extends through the support.

9. The lamp of claim 2, further comprising
a support configured to support the light source, and
wherein the aiming screw extends through the support.

10. The lamp of claim 3, further comprising
a support configured to support the light source, and
wherein the aiming screw extends through the support.

11. The lamp of claim 4, further comprising
a support configured to support the light source, and
wherein the aiming screw extends through the support.

12. The lamp of claim 5, further comprising
a support configured to support the light source, and
wherein the aiming screw extends through the support.

13. The lamp of claim 6, further comprising
a support configured to support the light source, and
wherein the aiming screw extends through the support.

14. The lamp of claim 7, further comprising
a support configured to support the light source, and
wherein the aiming screw extends through the support.

15. The lamp of claim 1, wherein the first direction corresponds to a vertical direction of the vehicle.

16. A lamp mounted in a vehicle, comprising:
a light source,
a projection lens through which at least some of light emitted from the light source passes,
an optical axis adjustment mechanism configured to adjust a reference position of an optical axis of the projection lens,
a support configured to support the light source,
a lens holder configured to hold the projection lens, and disposed to be displaceable independently of the support, and
a frame including a bearing extending in the first direction,
wherein the optical axis adjustment mechanism includes an actuator having an electrically driven output shaft which pivots the optical axis in a second direction intersecting with a first direction about a pivot axis extending in the first direction,
a slider disposed to be slidable along the pivot axis, and
an aiming screw configured to slide the slider according to rotation of the aiming screw so as to translate the optical axis in the first direction,
wherein the actuator and the slider are coupled with the lens holder, and
wherein the lens holder includes a first portion and a second portion extending in the first direction,
the first portion is coupled with the bearing to be rotatable and slidable, the second portion is coupled with the slider to be rotatable and non-slidable, and is coupled with the output shaft to be non-rotatable and slidable, and the slider is supported by the frame so as to be non-rotatable and slidable with respect to the output shaft.

* * * * *